No. 726,766. PATENTED APR. 28, 1903.
W. SCHAEFER.
FLOWER POT.
APPLICATION FILED NOV. 4, 1902.
NO MODEL. 2 SHEETS—SHEET 1.
Fig. 1.
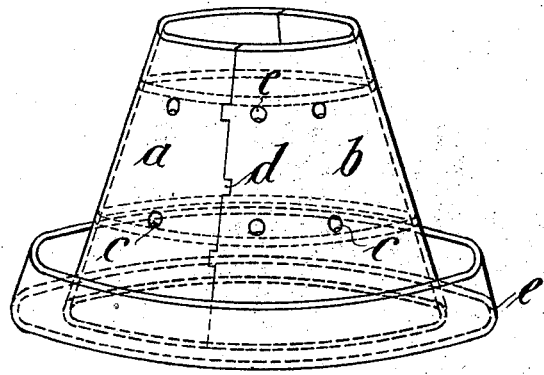
Fig. 2.
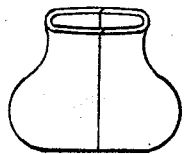
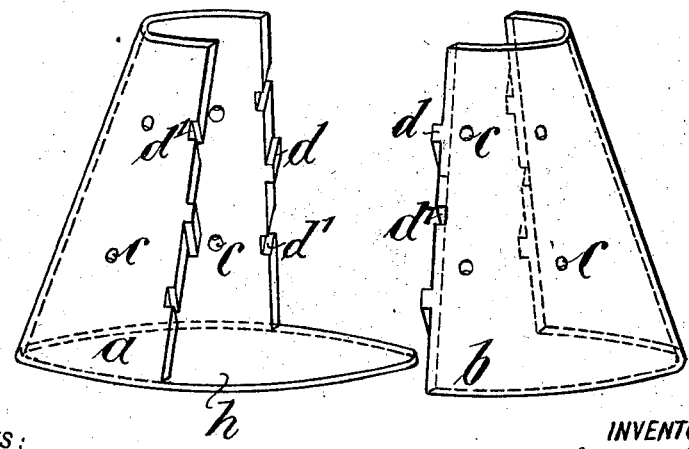
Fig. 3.
WITNESSES: INVENTOR
Wilhelm Schaefer
ATTORNEYS.

No. 726,766. PATENTED APR. 28, 1903.
W. SCHAEFER.
FLOWER POT.
APPLICATION FILED NOV. 4, 1902.
NO MODEL. 2 SHEETS—SHEET 2.
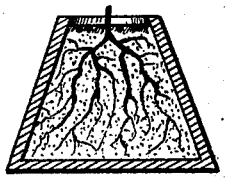
*Fig.4.*
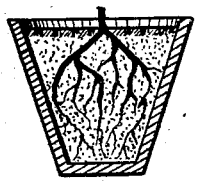
*Fig.5.*
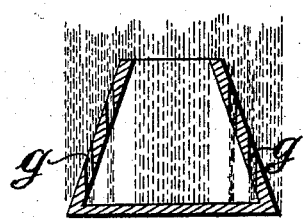
*Fig.6.*
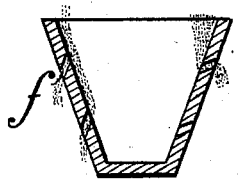
*Fig.7.*
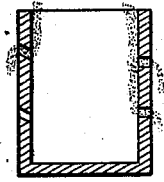
*Fig.8.*
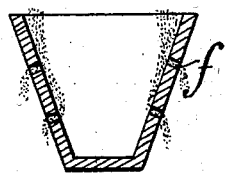
*Fig.9.*
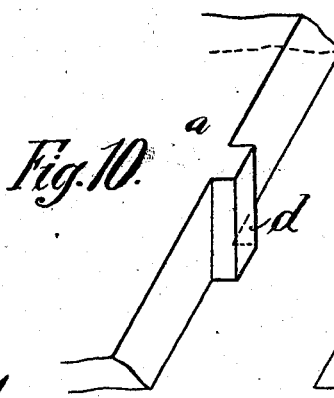
*Fig.10.*
*Fig.11.*
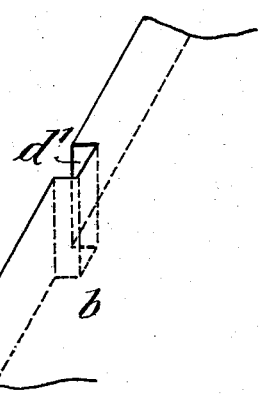
*Fig.12.*
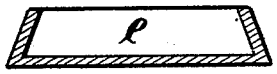
*Fig.13.*
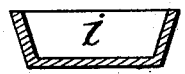
*Fig.14.*
WITNESSES
INVENTOR
Wilhelm Schaefer
ATTORNEYS.

ated April 28, 1903.

UNITED STATES PATENT OFFICE.

WILHELM SCHAEFER, OF HAGEN, GERMANY.

FLOWER-POT.

SPECIFICATION forming part of Letters Patent No. 726,766, dated April 28, 1903.

Application filed November 4, 1902. Serial No. 130,094. (No model.)

*To all whom it may concern:*

Be it known that I, WILHELM SCHAEFER, a citizen of the Kingdom of Prussia, residing at Hagen, Westphalia, in the Empire of Germany, have invented certain new and useful Improvements in Flower-Pots, of which the following is a specification.

This invention relates to flower-pots of that class provided with a base portion larger than the mouth for providing ample space in the lower part of the pot in which the roots of the plant can spread.

The object of the invention is to provide a flower-pot of this character that may readily adapt itself for transplanting the plant when desired by reason of its simple construction and that is provided with ventilating and evaporating openings in its conical portion so arranged as to retain the soil in the pot without danger of its being carried away by a superfluity of water passing into the pot, at the same time serving the purpose for which they are intended.

To this end the invention consists of a flower-pot comprising a frusto-conical body having a plurality of vertically-disposed openings in its conical portion, said body being formed of vertically-divisible halves, a base integral with one of said halves at its wide end, and tongue-and-groove joints separably connecting said sections, which with other novel features of construction and combinations of parts will be fully described hereinafter and finally pointed out in the claims.

In the accompanying drawings, Figure 1 is a perspective view of a flower-pot with drip-cup. Fig. 2 is a view of a modified flower-pot. Fig. 3 is a perspective view of the flower-pot shown in Fig. 1 taken to pieces. Figs. 4 to 9 are details which will be referred to later on. Fig. 10 represents, on an enlarged scale, parts of the two pot-halves to show a tongue and a groove. Fig. 11 is a vertical central section through the drip-cup shown in Fig. 1. Fig. 12 is a vertical central section through an ordinary drip-cup. Fig. 13 is a perspective view of a modified drip-cup made in two parts, and Fig. 14 is a perspective view of another modification of the new drip-cup provided with steadying-arms.

Similar letters of reference refer to similar parts throughout the several views.

Ordinary flower-pots, such as shown in Fig. 5, are most objectionable, for the reason that they afford the least space to the plant-roots where these require the most space—viz., at the bottom. Fig. 6 will show that a flower-pot of a conical shape, the reverse of that of ordinary flower-pots, will afford the most space to the roots at the bottom, and hence such a pot according to my invention will answer its purpose far better than the ordinary flower-pot. If the walls of the latter be provided with several ventilating and evaporating holes $f$, (see Figs. 7 and 9,) there would be the disadvantage that most of the water poured in the pot will escape through these holes without further profit to the plant-roots. It does not matter whether such holes are inwardly or outwardly inclined, as in Fig. 7 on the right and in Fig. 9, respectively, or nearly vertical, as in Fig. 7 on the left, as the defect named will remain the same. It is well known that the ordinary flower-pots are given the shape shown in Fig. 5 to facilitate the taking out of the roots and the soil for transplanting. Even if the pots were to have cylindrical walls, as is shown in Fig. 8, the defect named would still remain unaltered. If, however, a flower-pot according to my invention and shown in Fig. 4 is provided with a plurality of ventilating and evaporating holes $g\,g$ in its conical wall, (see Fig. 6,) the said defect will be entirely avoided, and this the more if the holes $g$ are placed vertically, or nearly so.

From an inspection of Fig. 6 it will be evident that even during a rain the water getting into the new flower-pot is not likely to at once escape, but it will be collected. When pouring water on the soil in the pot, the shape of the holes $g$ will prevent soil from being carried away with the water should any escape. The several holes $g$ will also show easily whether the plant-roots require to be watered or not. With ordinary flower-pots, such as in Fig. 7 or Fig. 9, this would not be possible, for the reason explained above. It would be necessary to take the roots and soil bodily out of the pot for examination, which, however, is evidently objectionable.

For transplanting the flower or plant the conical wall of the new flower-pot is made in two halves $a$ and $b$. (See Figs. 1 and 3.) The joints of these halves are provided with several tongues $d$ and grooves $d'$ for engaging each other. (See Fig. 10.) These tongues and grooves are inwardly inclined to prevent any dislocation of the two halves *a* and *b* and to return any water percolating to the outside back into the interior. The two halves are provided with more or less vertical ventilating and evaporating holes *c* and may be held together by hoops placed over them or otherwise. To further the cohesion of the two halves *a* and *b*, they are put into a drip-cup *e*, (see Fig. 11,) having a conical wall in correspondence with that of the pot. The bottom *h* of the pot is preferably made in one piece with the one conical half *a*. Where so preferred, the pot may be packed in the drip-cup in order to secure its two halves. The drip-cup can also be made in two parts, as in Fig. 13, so as to surround the bottom edge of the pot more closely.

Where it is so preferred, the bottom *h* of the flower-pot may be omitted and replaced by the drip-cup.

From Figs. 4 and 5 it is obvious that the new flower-pot will be far steadier than the ordinary pot, owing to its larger base. It is also evident that the new drip-cup *e*, being large in size, will better steady the pot than the cup *i*, Fig. 12, of the ordinary pot.

For large flowers or plants the drip-cup *e* may be replaced by another cup *k*, provided with several arms *l* (see Fig. 14) for steadying the plant.

It is obvious that a bulged flower-pot (see Fig. 2) would also be better than the ordinary pot. It could be made in two parts in a similar manner as described above.

What I claim as my invention, and desire to secure by Letters Patent, is—

1. A conical flower-pot increasing in diameter from top to bottom, the conical wall of which is made in halves provided on the joints with a plurality of inwardly-inclined tongues and grooves for engaging each other and preventing any dislocation of said halves, the one of said halves being made in one piece with the bottom, and said conical wall being provided with a plurality of ventilating and evaporating holes placed more or less vertically, substantially as set forth.

2. The combination, with a conical flower-pot increasing in diameter from top to bottom and provided with a plurality of ventilating and evaporating holes placed more or less vertically in the conical wall, of a drip-cup having a conical wall increasing in diameter from edge to bottom, substantially as set forth.

3. The combination, with a conical flower-pot increasing in diameter from top to bottom and provided with a plurality of ventilating and evaporating holes placed more or less vertically in the conical wall, of a drip-cup having a conical wall increasing in diameter from edge to bottom, the conical wall of said pot being made in halves, that are provided on the joints with a plurality of inwardly-inclined tongues and grooves for engaging each other and preventing any dislocation of said halves, substantially as set forth.

In testimony that I claim the foregoing as my invention I have signed my name in presence of two subscribing witnesses.

WILHELM SCHAEFER.

Witnesses:
OTTO KÖNIG,
J. A. RITTERSHAUS.